US008775438B1

(12) United States Patent
Brooker et al.

(10) Patent No.: US 8,775,438 B1
(45) Date of Patent: Jul. 8, 2014

(54) INFERRING RESOURCE ALLOCATION DECISIONS FROM DESCRIPTIVE INFORMATION

(75) Inventors: Marc J. Brooker, Cape Town (ZA);
Cornelle Christiaan Pretorius Janse van Rensburg, Cape Town (ZA);
Abhinav Agrawal, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/240,766

(22) Filed: Sep. 22, 2011

(51) Int. Cl.
*G06F 7/00* (2006.01)
*G06F 17/30* (2006.01)

(52) U.S. Cl.
USPC .......................................... 707/748; 707/751

(58) Field of Classification Search
USPC .................................. 707/748, 751
See application file for complete search history.

(56) References Cited

U.S. PATENT DOCUMENTS

| | | | |
|---|---|---|---|
| 5,812,750 A | 9/1998 | Dev et al. | |
| 7,185,073 B1* | 2/2007 | Gai et al. | 709/221 |
| 7,743,127 B2 | 6/2010 | Santos et al. | |
| 8,104,069 B2* | 1/2012 | Thurm et al. | 726/1 |
| 2001/0023440 A1 | 9/2001 | Franklin et al. | |
| 2002/0143786 A1* | 10/2002 | Ayi et al. | 707/102 |
| 2004/0169654 A1 | 9/2004 | Walker et al. | |
| 2004/0260796 A1 | 12/2004 | Sundqvist et al. | |
| 2005/0091031 A1* | 4/2005 | Powell et al. | 704/4 |
| 2005/0198243 A1* | 9/2005 | Snible et al. | 709/223 |
| 2005/0198333 A1* | 9/2005 | Dinges et al. | 709/229 |
| 2005/0267887 A1 | 12/2005 | Robins | |
| 2006/0085852 A1* | 4/2006 | Sima | 726/22 |
| 2006/0206485 A1* | 9/2006 | Rubin et al. | 707/9 |
| 2006/0218155 A1 | 9/2006 | Fisher et al. | |
| 2007/0214497 A1* | 9/2007 | Montgomery et al. | 726/4 |
| 2008/0163124 A1 | 7/2008 | Bonev et al. | |
| 2010/0050173 A1 | 2/2010 | Hensbergen | |
| 2010/0312871 A1 | 12/2010 | DeSantis et al. | |
| 2011/0022711 A1 | 1/2011 | Cohn | |
| 2011/0029675 A1 | 2/2011 | Yeow et al. | |
| 2011/0078652 A1 | 3/2011 | Mani et al. | |
| 2012/0096165 A1 | 4/2012 | Madduri et al. | |

OTHER PUBLICATIONS

U.S. Appl. No. 12/973,746, filed Dec. 20, 2010, Titled: Virtual Resource Provisioning With Capacity Coloring.
U.S. Appl. No. 13/704,982, filed Mar. 29, 2011, Titled: Optimizing Communication Among Collections of Computing Resources.
Houidi, et al., "Virtual Resource Description and Clustering for Virtual Network Discovery", Communications Workshops, ICC Workshops IEEE International Conference, Jun. 14-18, 2009.

(Continued)

*Primary Examiner* — Apu Mofiz
*Assistant Examiner* — Jared Bibbee
(74) *Attorney, Agent, or Firm* — Kilpatrick Townsend & Stockton LLP

(57) ABSTRACT

A provisioning system may select an available implementation resource by analyzing user data to infer a role of a proposed computing resource and comparing the role to roles of other existing computer resources. The user data may include a user-specified identifier for the proposed computing resource, such as a label. The role may be used to rank available implementation resources using factors including distance to, roles of, and relationship with other user computing resources. A ranking of available implementation resources may be used to select an implementation resource for provisioning the proposed computing resource.

25 Claims, 10 Drawing Sheets

(56) References Cited

OTHER PUBLICATIONS

Jordan, TS "How to Connect Windows XP with Vista in a LAN" [online]. Ehow.com, Oct. 9, 2010 [retrieved on Oct. 15, 2012]. Retrieved from the Internet: <http://web.archive.org/web/20101009082913/http://www.ehow.com/how_5845684_connect-windows-xp-vista-lan.html>.

* cited by examiner

INFERRING RESOURCE ALLOCATION DECISIONS FROM DESCRIPTIVE INFORMATION

CROSS-REFERENCE TO RELATED APPLICATIONS

U.S. Non-Provisional application Ser. No. 12/973,746 filed Dec. 20, 2010, is hereby incorporated by reference in its entirety.

BACKGROUND

Administering computing resources can be a complex task. With servers, for example, each server may have required configurations and settings to prepare. These configurations should be balanced with proper security and redundancy. However, if, during this balancing, one of the server components is not linked together correctly, applications may not work optimally, if at all. For example, a web server may require database server communication information such as database hostname, database name, username and password. If the configuration information is incorrect or the permissions are incorrect, the web server may not be able to retrieve data from the database server.

Fault tolerance may also be a consideration for an administrator and developer. Redundancies may be built into the application and redundant servers provisioned. For example, the administrator may provision several databases with redundant data, in case of a failure. Unfortunately, redundancies may still fail if the redundancies share hardware that fails. However, having servers or other resources spread further apart may not be desirable because of an increase of latency and decrease of bandwidth. For example an application may have increased latency and appear slower because of too many network bottlenecks, possibly due to multiple routers. While various conventional techniques have been employed to effectively allocate computing resources, due to the complexity of the tasks, the employed techniques are of varied success.

DETAILED DESCRIPTION

Figure 1:
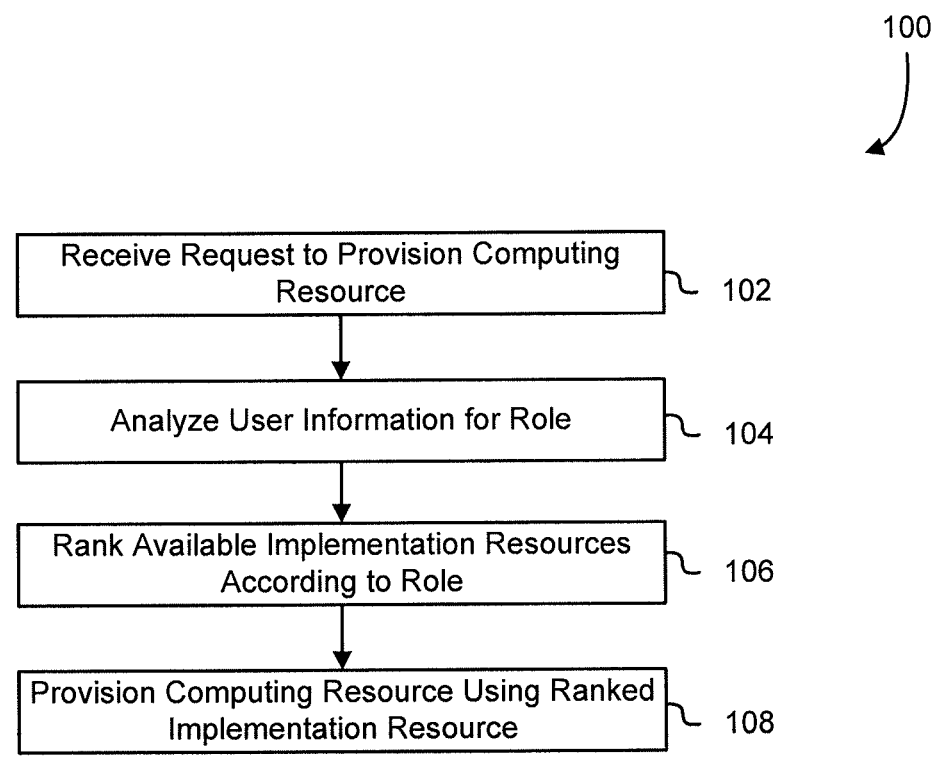
FIG. 1 shows an illustrative example of a process that may be used to provision computing resources from inferred roles in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for inferring a role of a proposed computing resource and provisioning the proposed computing resource with a determined placement. The determined placement in at least some embodiments is consistent with a role relationship of the proposed computing resource with respect to other resources. For example, a user may have a current resource named "My Application DB #1." The user may request to provision a new computing resource with a name of "My Application DB #2." A provisioning system may note the similarities between the application names, and can infer that DB indicates a database role. Selecting the database role, the provisioning system may then examine and rank available implementation resources. An available implementation resource may be an unassigned computing resource that accepts a user program or series of programs, such as a guest operating system slot on a host machine. As a database role may define that spreading database resources are more desirable to avoid same-hardware failure, available implementation resources that are more distant to the related resource named "My Application DB #1" may receive higher rankings. The provisioning system may then provision the new computing resource using a highly ranked available implementation resource.

Examining user-specified information to infer a role, such as a name of "My Application DB #1," may allow a provisioning system to make better choices regarding resource placement. By inferring a role of a proposed computing resource, relationships with other computing resources having a role may be easier to determine. When computing resources are viewed in terms of roles, placement of the computing resources may be defined in terms of role relationships. A role of a computing resource may define which roles are desirable to have near the computing resource and which roles are desired to have at a further distance. These desired distances may be expressed in a proximity condition relating one role to another role that when calculated, results in a rating of the distance between two roles. Applying the proximity condition to an available implementation resource using an inferred role of a proposed computing resource, a ranking score may be calculated using the role relationships with other instantiated resources having roles. For example, as discussed in the example above, it may be desirable to have databases more tolerant to failure, which may mean less shared hardware with other databases. Therefore, when a provisioning system infers a database role for a proposed computing resource, the proximity condition may cause available implementation resources closer to other user databases to be scored lower than those further away. Using the ranking scores of multiple available implementation resources, a ranking of the available implementation resources may be created. The ranking may then be used to make a decision as to which available implementation resource may be used to instantiate the proposed computing resource. In some embodiments, the highest ranked available implementation resource would be used.

Figure 10:
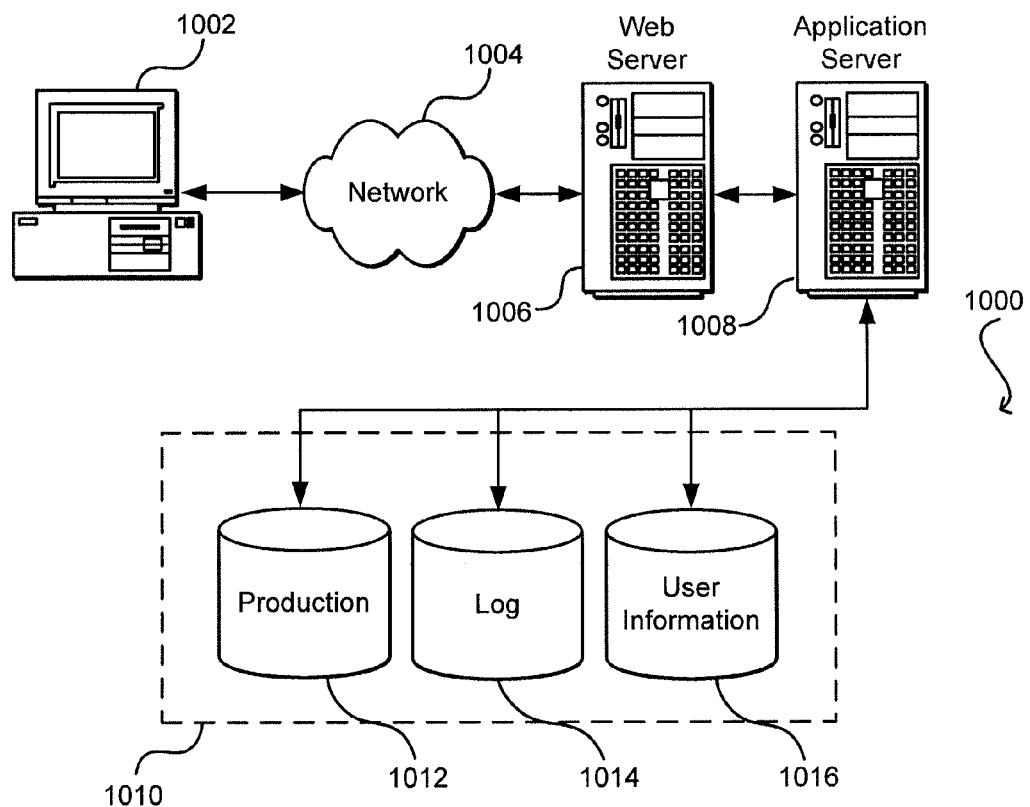
FIG. 10 illustrates an environment in which various embodiments can be implemented.

In one embodiment, shown in FIG. 1, a provisioning system may use a process 100 to determine computing resource placement using user-specified data. Some or all of the example process 100 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. For example, an application server 1008 as seen in FIG. 10, or other computer systems involved in the provisioning of computing resources may include a provisioning system to determine computing resource placement.

Figure 2:
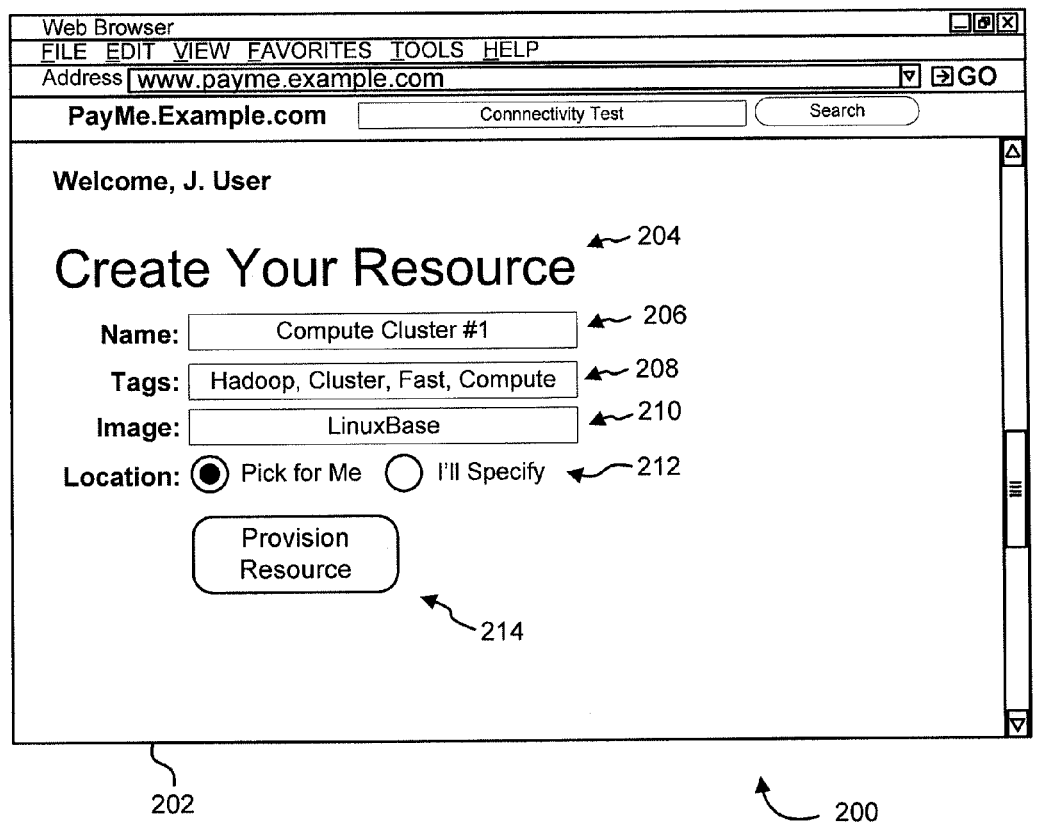
FIG. 2 shows an illustrative example of a web page for provisioning resources in accordance with at least one embodiment.
Figure 3:
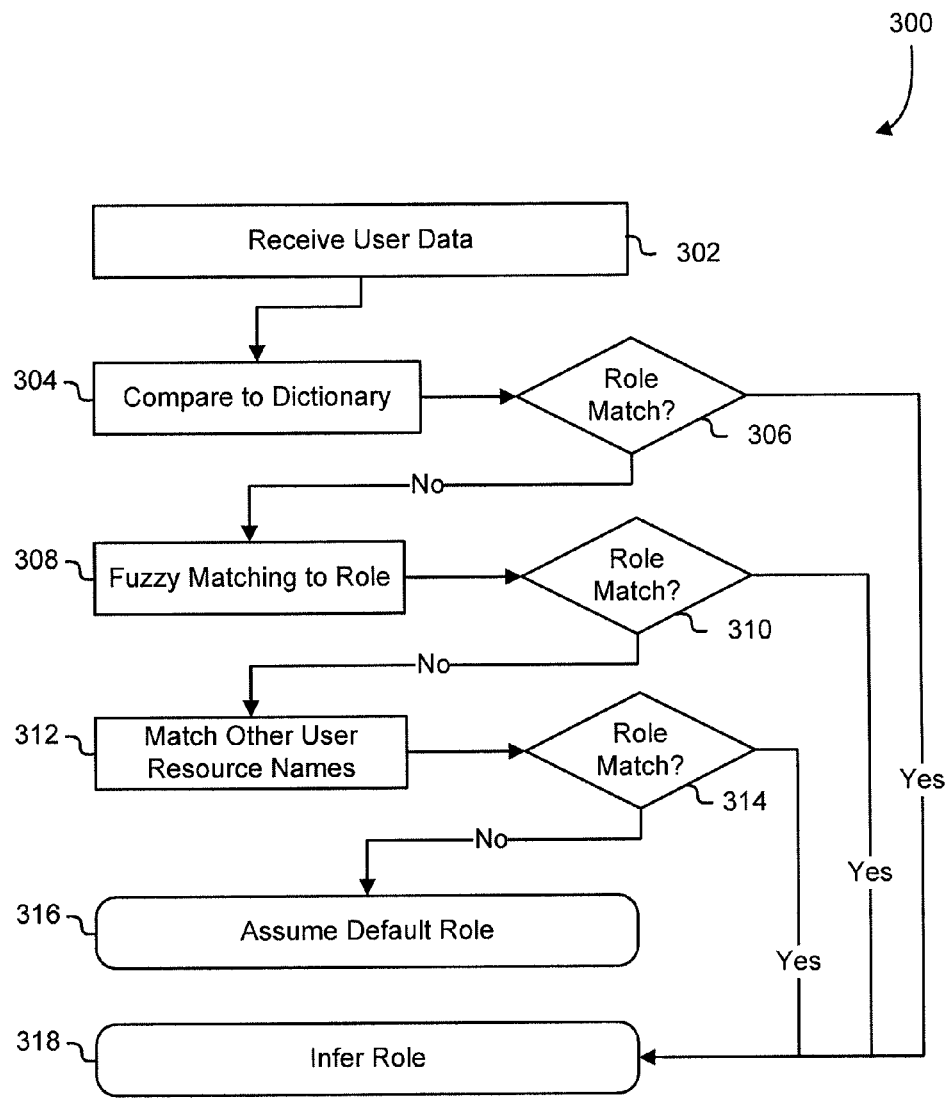
FIG. 3 shows an illustrative example of a process that may be used to infer a role using user data in accordance with at least one embodiment.
Figure 4:
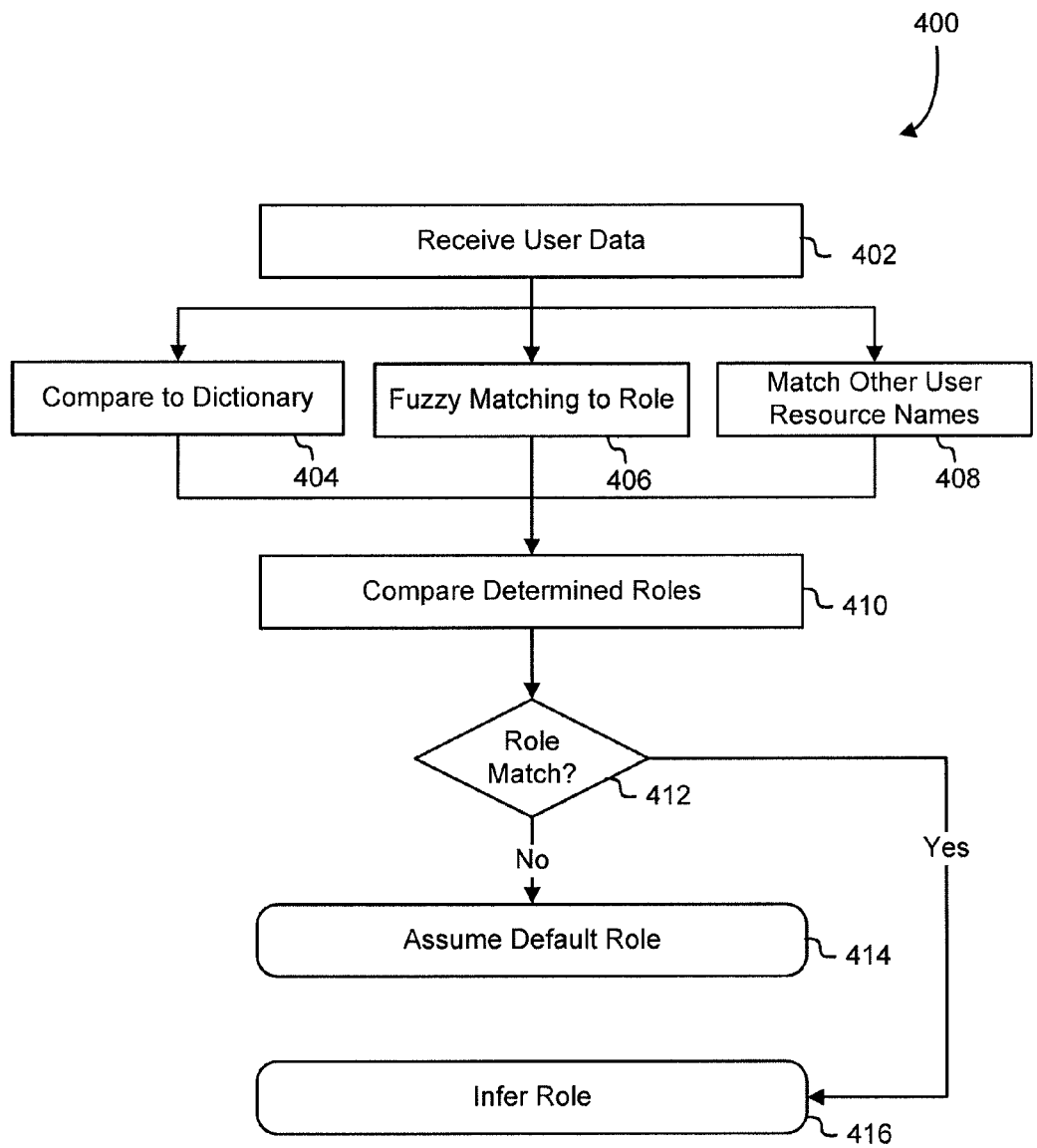
FIG. 4 shows an illustrative example of an alternate process that may be used to infer a role using user data in accordance with at least one embodiment.
Figure 6:
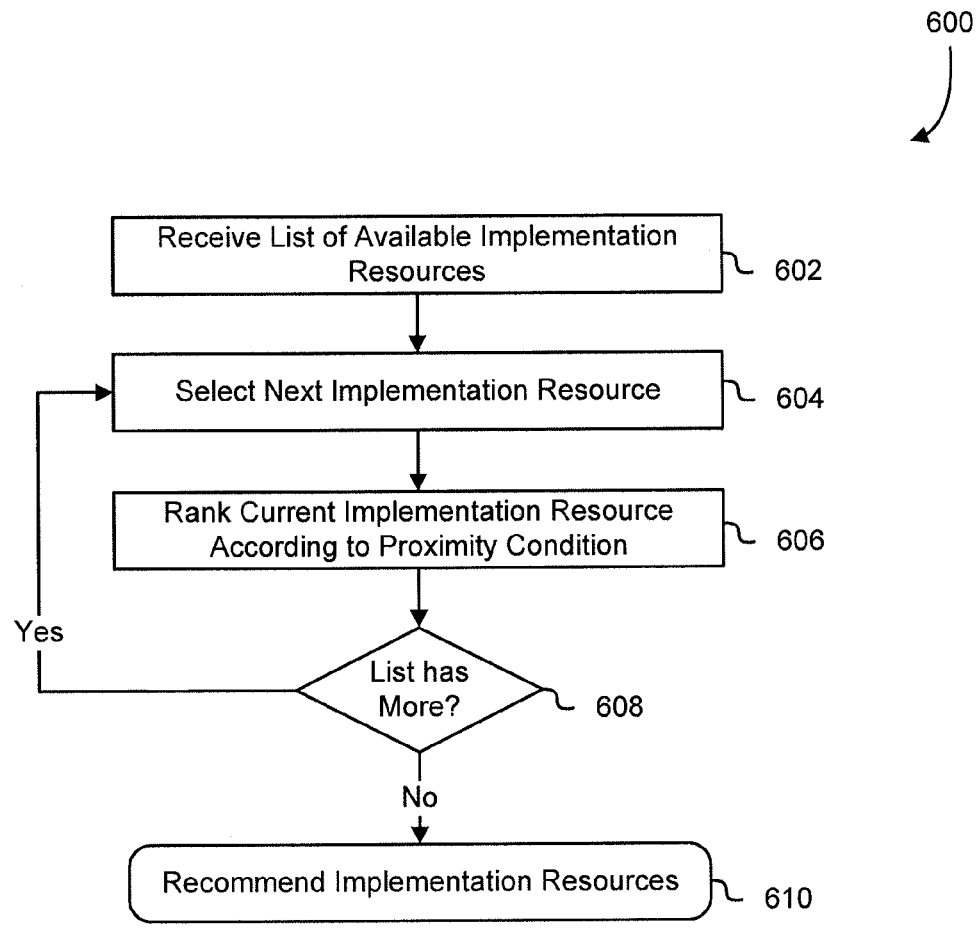
FIG. 6 shows an illustrative example of a process that may be used to rank available resources in accordance with at least one embodiment.
Figure 8:
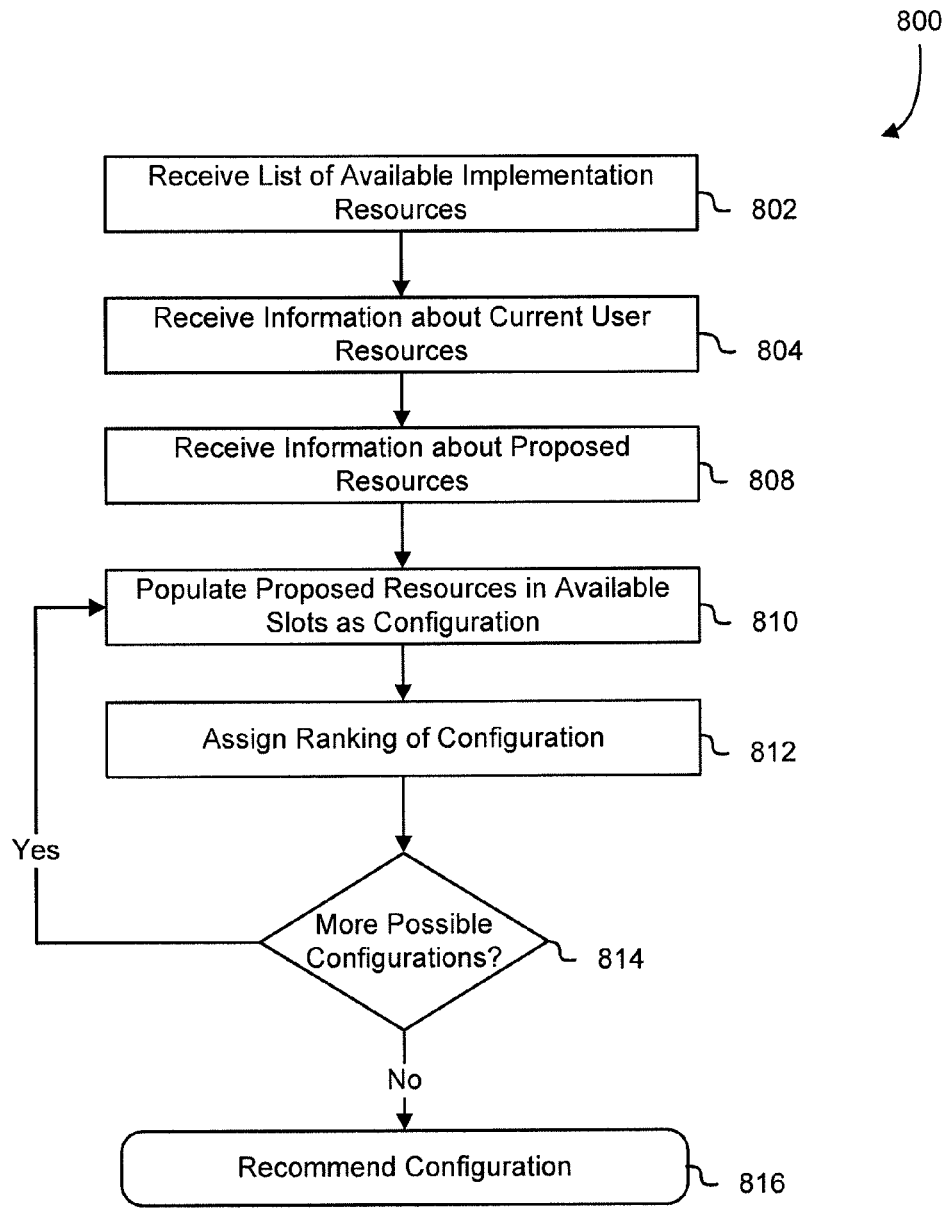
FIG. 8 shows an illustrative example of a process that may be used to rank a configuration of available resources in accordance with at least one embodiment.
Figure 9:
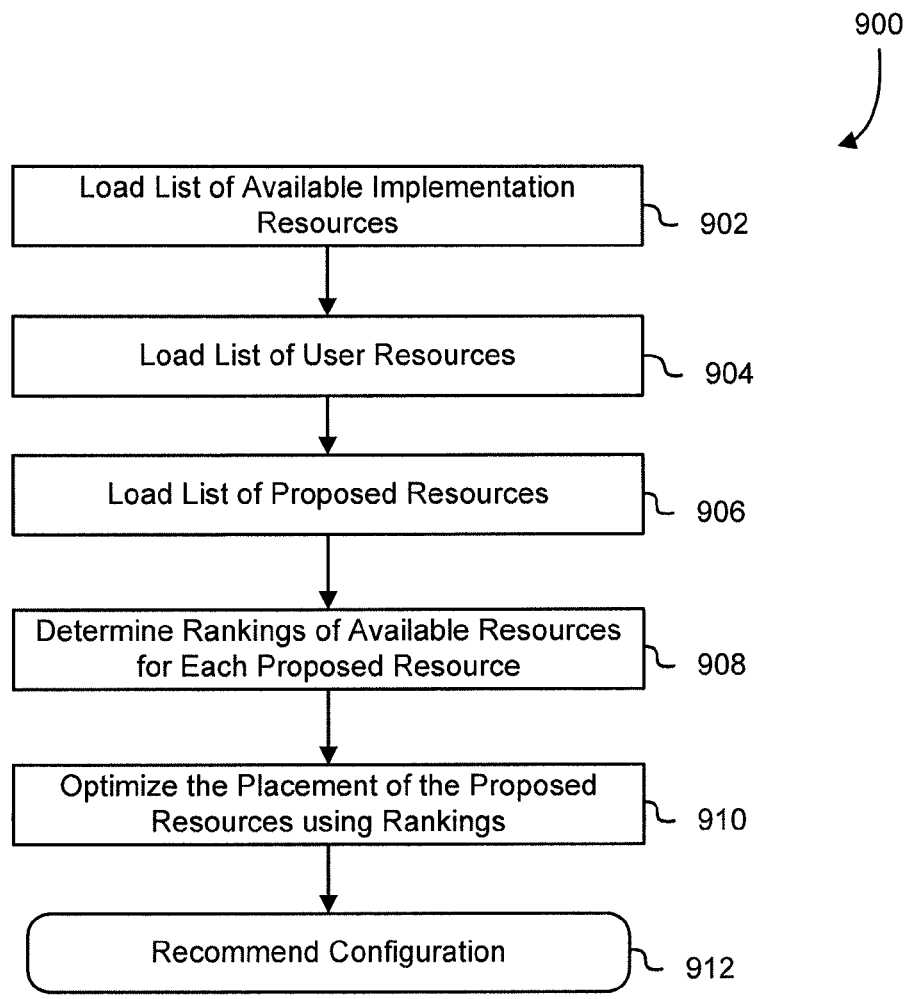
FIG. 9 shows an illustrative example of an alternate process that may be used to rank a configuration of available resources in accordance with at least one embodiment.

Having decided to implement a new resource, a user may input a configuration and name of a computing resource. The user may then request to provision the computing resource. The provisioning system may receive 102 the request to provision a proposed computing resource. For example, a user may request to provision a new machine image, containing an operating system in a data center having virtualized hosts as seen in FIG. 2. User information relating the resource, such as title, tags, or other user-provided information may be analyzed 104 to determine a best role match, or inferred role, for the proposed computing resource. For example, FIGS. 3-4 show illustrative examples of processes that may be used to analyze user-provided information for an inferred role. Using the determined role, a provisioning system may rank 106 available implementation resources using a proximity condition. The proximity condition may use distance measurements and affinity between the determined role and roles of other user resources to prepare a score for available implementation resources. The provisioning system may then provision 108 the proposed computing resource using an implementation resource recommended by the ranking. For example, FIGS. 6, 8 and 9 show illustrative examples of processes that may be used to rank available implementation resources. In other embodiments, an implementation resource is selected from a set of available implementation resources that meet minimum criteria as defined by a proximity condition. For example, an available implementation resource may be selected from a pool of available implementation resources that share a router with another user implementation resource which has a role of cluster.

In one embodiment, as seen in FIG. 2, the user data may be received in conjunction with a web page 200. The user data may be input via a web page 200 displayed on a web browser interface 202. The web browser interface may interface may include instructions 204 and user data input controls. User data input controls may include name field 206, tags field 208, image selection field 210, user override 212 and submission button 214. The instructions 204 may guide the user through operation of the current web page 200. A name field 206 may be useful to identify the requested computing resource from other computing resources. A tag field 208 may be useful to describe features or functionality of the computing resource. An image field 210 may be useful to identify a machine image to be used by the computing resource. A machine image may include programming information that may be given to an available implementation resource to perform tasks. For example, a guest operating slot when unused may be an available implementation resource that may receive a Linux™ machine image to become a web server. A user override 212 may allow a user to select or suggest a proximity to other resources in the data center in lieu of allowing the system to pick an implementation resource.

User data may also be received in other ways. For example, user data may also be received through an application programming interface (API), as well as requests to provision resources. In one embodiment, a developer may have a program that contacts the provisioning API when new computing resources are needed. For example, the program may contact the provisioning API and request a new computing resource named "My Application DB #4." The provisioning API may then use the user data to infer a role and place the new database server at an appropriate distance from other computing resource roles. User data may also be contained in metadata. For example, a proposed computing resource may come from a machine image, such as a snapshot. During creation of the machine image, user data associated with the machine image may be stored as XML metadata alongside or within the image. The user data may be input by the user or copied during a snapshot procedure. In another embodiment, a user may input user data and request provisioning from a mobile application. In another embodiment, upon receiving a user request to examine the proposed computing resource, a provisioning system may examine the proposed computing resource to extract user information. For example, a user may request that the provisioning system extract a hostname from the proposed computing resource to use as an identifier of the proposed computing resource.

Once the user data has been received by the provisioning system, in an embodiment, the user data may be analyzed for a role. In one embodiment, as illustrated in FIG. 3, a process of inferring a role may be followed by a provisioning system to infer a role. The provisioning system may receive 302 the user data and compare 304 the user data to a dictionary of words associated with roles. If a sufficient match is made 306 between the user data and the dictionary words, the role associated with the words may be inferred 318. For example, use of the words "cluster," "hadoop," "compute," "fast," and/or use of the abbreviation "clstr" may indicate a cluster role. If not a match 306, the provisioning system may use 308 fuzzy matching to analyze the user data to a role. If a sufficient match is made 310 between the user data using fuzzy matching analysis, the role determined by fuzzy analysis may be inferred 318. For example, abbreviations such as "DataB" may be matched with a database dictionary word, even though not a direct match in the dictionary. Fuzzy matching, for example, may include approximate string matching, and/or computing a Levenshtein distance or other metric of string similarity. If not a match 310 through fuzzy matching analysis, the user data may be matched 312 against other resource names. For example, a fuzzy matching analysis may compute a score of similarity between the user-specified data and dictionary words. If the score is within a range, the strings may be defined as matching. If a sufficient match is made 314 between the user data using resource name matching, the role determined by resource name matching may be inferred 318. For example, if another resource is named "MyD 1" with a determined role of database, a new resource named "MyD 2" may be inferred to have the same role as "MyD 1." If not a match 314, a default role may be inferred. The default role may be a role having basic assumptions.

In another embodiment shown in FIG. 4, the roles may be determined by a process 400 that combines measurements and infers a role. For example, an application server 1008 as seen in FIG. 10, or other computer systems involved in the provisioning of computing resources may include a provisioning system to infer roles. The user data may be received 402, and then processed by comparing 404 the user data to a dictionary, performing 406 fuzzy matching to the dictionary, and matching 408 the user data to other resources with roles. The system may then use the resulting information provided by operations 404, 406 and 408 to compare 410 the determined roles and determine 412 if there is a role match. If no match or a split match, a default role may be assumed 414. If there is a match, a role may be inferred 416. The actions recited may be performed as described above and in conjunction with FIG. 3.

Roles may be viewed as the services offered or relationships to other computing resources. Depending on the granularity of the configurations supported, roles may be generic and/or specific. Generic roles may include application, computing, database, redundancy and storage. Specific roles may include database shard, web server, load balancer and API server. Each role may have a suggested proximity to other roles, which may be used in making decisions to instantiate new computing resources in a data center. For example, databases as a general rule may not need speed or bandwidth to other databases within the same application. But should one database fail, other databases may continue to operate and serve information to an application server. Therefore, a database role to database role placement may encourage larger distances between the resources. However, a database role to application server role ranking may favor closer distances. As the application server may be in frequent communication with an application server, the speed may be worth the risk of both services sharing a hardware failure. Furthermore, the database may not be able to function without the application server. If the application server fails or both the application server and the database fail, the outcome may not be any different. The application will not be functional, and a closer distance would be acceptable. In another example, a cluster node may operate more efficiently at a closer distance. Having several cluster nodes fail may be an acceptable risk, but having a slower communication between nodes may not be as acceptable. Therefore, cluster nodes may be desirable to locate closer together. Each role may thus have rules about proximity or a proximity condition. In some embodiments, the rules are symmetrical. In another example, a redundant role may include a redundant server be provisioned such that if an active server experiences a problem the redundant server may immediately replace the active server. The redundant server may require sufficient distance to minimize shared hardware failures, but close enough distance to access the resources and receive information related to the active server. The redundant role, therefore, may rate an intermediate distance as desirable.

Figure 5:
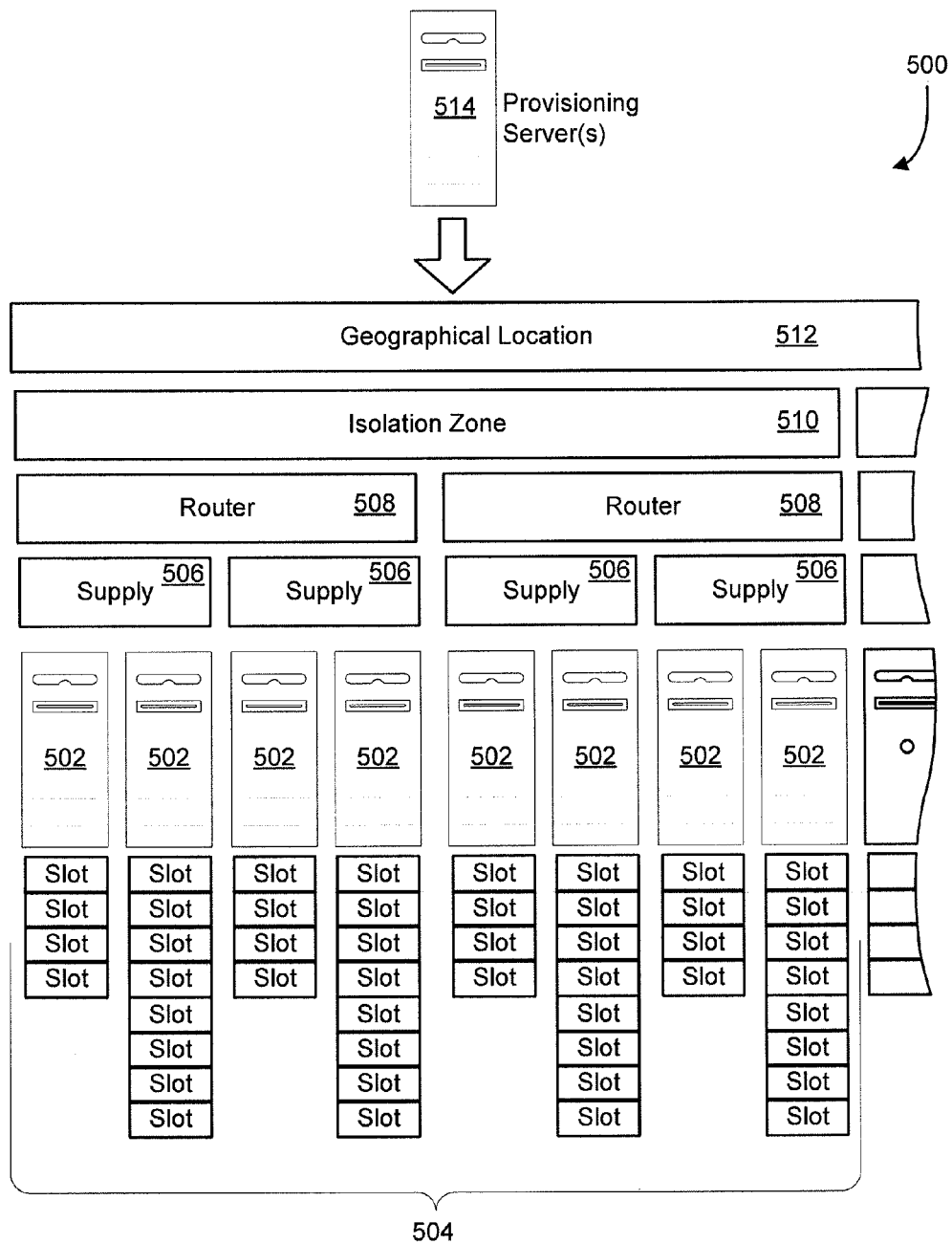
FIG. 5 shows an illustrative example of a data center environment in accordance with at least one embodiment.

Part of ranking an available implementation resource may include determining a distance between an available implementation resource and a current user resource. A data center 500 may be viewed as a collection of shared computing resources and/or shared infrastructure. For example, as shown in FIG. 5, a data center 500 may include virtual machine slots 504, physical hosts 502, power supplies 506, routers 508, isolation zones 510 and geographical locations 512. A physical host 502 may be shared by multiple virtual machine slots 504, each slot 504 capable of holding a guest operating system. Multiple physical hosts 504 may share a power supply 506, such as a power supply 506 provided on a server rack. A router 508 may service multiple physical hosts 504 across several power supplies 506 to route network traffic. An isolation zone 510 may service many routers 508, the isolation zone 510 being a group of computing resources that are serviced by redundancies such as backup generators. Multiple isolation zones 510 may reside at a geographical location 512, such as a data center 500. A provisioning server 514 may include a memory and processor configured with instructions to analyze user data and rank available implementation resources using determined roles and shared resources/infrastructure in the calculation. The provisioning server 514 may also manage workflows for provisioning and deprovisioning computing resources as well as detecting health and/or failure of computing resources.

Distance between resources or proximity may be measured by the degree of shared resources. This distance may be used in the ranking of resources according to role. For example, a first system on a host 502 that shares a router 508 with a second system may be more proximate to the second system than to a third system only sharing an isolation zone 510. In one embodiment a distance between two slots 504 sharing a physical host 502 may be defined as a zero distance. A distance between two slots 504 on two different physical hosts 502 sharing a power supply 506 may be defined as a 1 distance. A distance between two slots 504 on two different physical hosts 502 on different a power supplies 506 sharing a router 508 may be defined as a 2 distance. The distance may be further incremented for each level of unshared resource. In another embodiment, the distance may be defined in terms of unshared resources. For example, two slots 504 sharing a router 508 may have a distance of a physical host 502, and a power supply 506. Each difference in resources may be weighted differently in a distance calculation.

Potential placements of computing resources within a data-center may be scored according to distances using proximity conditions as defined by roles. An application server 1008 as seen in FIG. 10, or other computer systems involved in the provisioning of computing resources may include a ranking system to evaluate placements of computing resources such as in process 600. As seen in the process 600 described in FIG. 6, a system may first receive 602 a list of available implementation resources to evaluate. The next available implementation resource may be selected for evaluation 604. The available implementation resource may be ranked 606 according to a proximity condition described in the determined role. If the list has 608 more unranked available implementation resources, the unranked available implementation resources may each be selected 604 and ranked 606. The ranking system may then recommend 610 one or more available implementation resources.

When ranking a resource, the provisioning system may use a distance between resources and/or shared/unshared resources in its calculation. The resources may be evaluated for roles, which may determine how each differing resource may receive a weight. For example, assuming two roles have an affinity for sharing a router, such as a database role and an application role, a rule may be created to improve placement of a proposed computing resource having one role and the implemented resource having the other role. In an example of weighting using FIG. 5, roles having differing routers 508 may be given a weight of −50. Roles having differing supplies 506 may be given a weight of 100. Roles having differing hosts 502 may be given a weight of 1000. Other distance measurements may be given a 0, with a higher score being preferable.

Using the rules above, and applying the process from FIG. 6 and the data center as described in FIG. 5, calculations may be performed by the provisioning system to evaluate placement within a datacenter. For example, a proposed application-server role sharing a router 508 with an existing database role, but nothing else below the router 508 may receive a perfect score of 1100. However the two roles not sharing the router may receive a score of 1050. Thus, the preference may be given to the available slots 504 sharing a router 508. In another embodiment, a role may specify a preferred distance to another role with weights assigned to deviations. For example, using the same preferences as before, an ideal deviation may be sharing a router 508 at a 2 distance with a 0 score, with a lower score being more preferable. Deviations lower than 2, may receive 1000 points for each number lower than 2 because too much risk would exist in hardware failure. Deviations higher than 2 may receive 50 points for each number higher than 2 because sharing less hardware is preferable to sharing more hardware, when forced to move away from the ideal distance. Thus, a proposed application-server role in a slot 504 sharing a router 508 with a database role with a score of 0 may be more preferable than two slots only sharing an isolation zone 510 with a score of 50.

In some embodiments, the proximity of resources evaluation may be further enhanced by determining related user resources. In one embodiment, user data may be analyzed and matched with other user resources to determine related user resources. For example, a user has two resources named "MyCluster 1" and "MyWebApp DB." If the user requests a new computing resource be instantiated with the name of "MyCluster 2," the provisioning system may match the "MyCluster 1" resource as related to the proposed resource of "MyCluster 2." Thus, the provisioning system may only evaluate the relationship between "MyCluster 1" and "MyCluster 2," as "MyWebApp DB" may be unrelated. In other embodiments, resources determined to be more related may receive a higher weight in the ranking of available implementation resources. Using the information from the prior example, the numerical rating between "MyCluster 1" and "MyCluster 2" may have a greater effect on the available implementation resource ranking than "MyWebApp DB" with "MyCluster 2" because of the highly related nature of the names.

Figure 7:
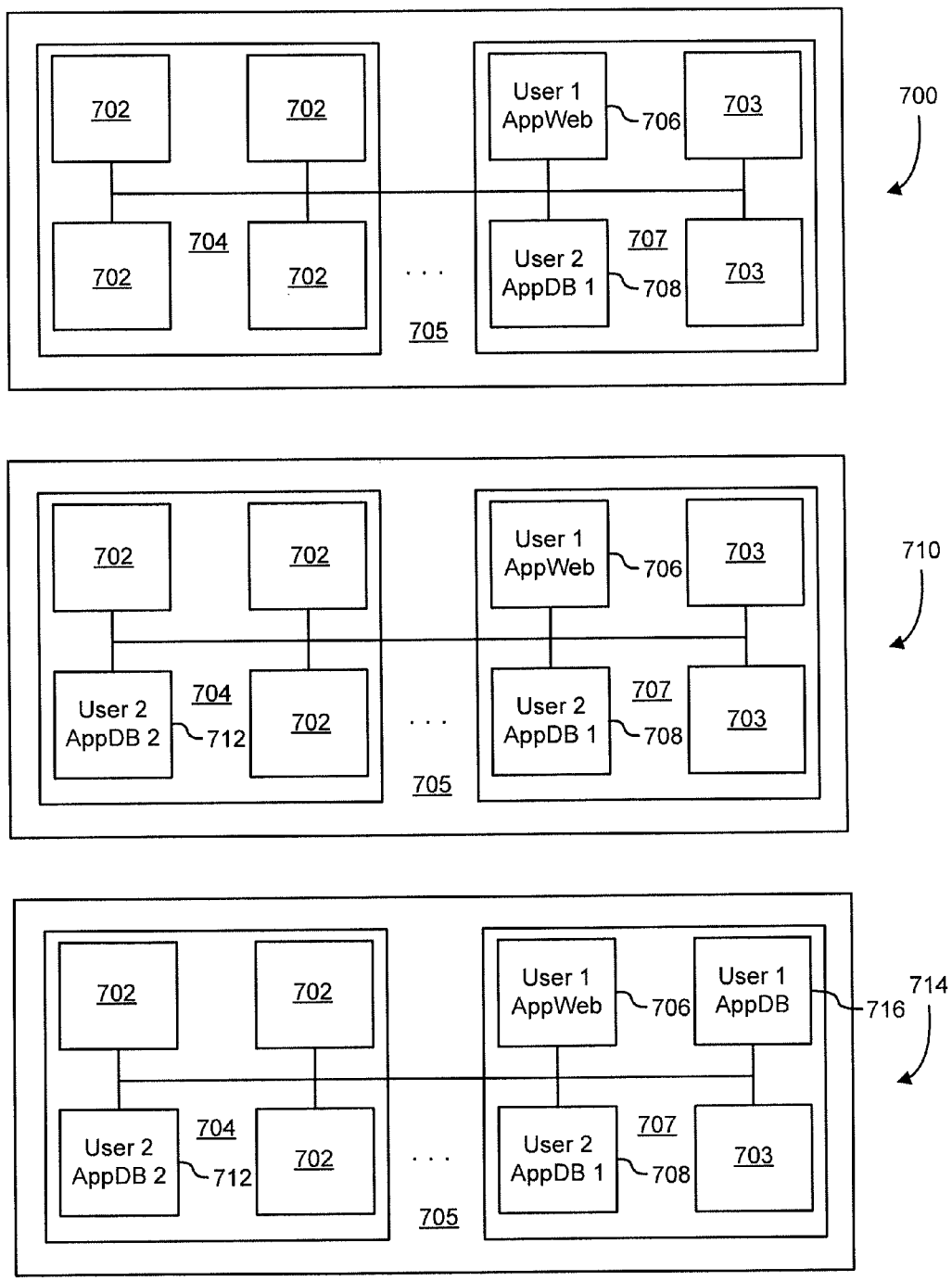
FIG. 7 shows an illustrative example of a portion of a data center before and after 2 provisioning cycles using inferred roles in accordance with at least one embodiment.

An example of using the processes of FIG. 1 and FIG. 6 may be seen in FIG. 7. FIG. 7 represents several views 700, 710, 714 of a data center before and after two provisioning steps. In a first view of a datacenter 700, computing resources are shown in terms of an isolation zone 705, routers 704 and 707, available implementation resources 702 and two user resources 706 and 708. A first user named User 1 has already provisioned a first resource named "AppWeb" 706, while a second user named User 2 has provisioned a resource named "AppDB 1" (708). In this example, provisioning on the same router is a distance of 1, while provisioning within the same isolation zone 705 without sharing a router is a distance of 2. A database role to database role may have a preferred distance of 2, while a preferred distance of database role to web server role may be a distance of 1. For each distance unit away greater than the preferred distance of database role to database role, 10 points may be added because a further distance may be marginally less desirable. For each unit less than the preferred distance of the database role to database role, 100 points may be added because a closer distance is much less desirable. For each distance unit away from the preferred distance of 1 for a database to application role, 10 points may be added. Related resources may have their ranking scores multiplied by 10. A lower score is defined as more desirable.

After a first view 700 and before a second view 710 of a datacenter, User 2 may request to provision another computing resource. User 2 may provide user data related to the proposed computing resource as a title of "AppDB 2" and request the ranking system to determine the best placement for the proposed computing resource. The ranking system may analyze the User information to provide a match as to role. Breaking apart the title "AppDB 2" may yield a dictionary match of "DB" within a role dictionary. "DB" may indicate a role of database in the role dictionary.

Reviewing other existing User 2 resources in the first view 700, the ranking system may find that User 2 has provisioned another resource as "AppDB 1" 708. The ranking system may discover that both systems have "AppDB" in their name, and infer a relationship, causing the distance score to be multiplied by 10. Having discovered "AppDB 1," its role may be determined if not known, or recalled if stored. In some embodiments, an inferred role may be stored with the resource, such as in metadata. Either way, the role of "AppDB 1" may be determined to be a role of a database.

Using the associated roles and relationship information, available implementation resources may be ranked. The ranking system may begin ranking available implementation resources 702 using a proximity condition to other user resources, which, in the example, are User AppDB 1. Available implementation resources 702 have a distance of 2 because of a shared isolation zone 705 with User 2 AppDB 1 (708). Since the applications are related, the ranking score may be multiplied by 10. Thus a distance of 2 is preferred with a score of 0.0 multiplied by 10 is 0. Thus, the ranking score of available implementation resources 702 may be 0. Available implementation resources 703 have a distance of the same router to User 2 AppDB 1 (708), resulting in a distance of 1. Since, the applications are related, the ranking score may be multiplied by 10. Thus, a distance of 1 is less than the preferred distance by 1 unit. Each unit under adds 100 points. Multiplying 100 points, for a unit under the preferred distance, by 10, for a related application, results in a score of 1000 for available implementation resources 703. With available implementation resources 702 having a score of 0 compared to available implementation resources 703 having a score of 1000, the ranking system would choose to instantiate the proposed resource of User2 AppDB 2 using an available implementation resource 702. The instantiation of User 2 AppDB 2 results in a second view 710 of the data center. User 2 AppDB 2 (712) was instantiated using one of the higher ranked available implementation resources 702.

After the second view of the data center 710 and before a third view of the data center 714, User 1 may request provisioning of a proposed resource with the title of "AppDB." The ranking system may match the user-specified data of "AppDB" with the dictionary word "DB," indicating a database role for the proposed resource. "AppWeb" 706 may be then found as a related resource because both resources share the "App" title portion. Assuming the resource "AppWeb" 706 was previously found to be a web server, the desired distance between the proposed "AppDB" and "AppWeb" 706 would be 1. The ranking system may then evaluate the available implementation resources using a proximity condition. Available implementation resources 702 would have a distance of 2 from User 1 AppWeb (706). An actual distance of 2 is one away from the desired distance of 1, resulting in a score of 10. Multiplying the score of 10 by 10, because of the inferred relationship, results in a ranking score of 100 for available implementation resources 702. Available implementation resources 703 would have a distance of 1 from User 1 AppWeb (706). An actual distance of 1 is the desired distance of 1, resulting in a score of 0. Multiplying the score of 0 by 10, because of the inferred relationship, results in a ranking score of 0 for available implementation resources 703. As available implementation resources 703 have a score of 0 compared with available implementation resources 702 score of 100, available implementation resources 703 may be recommended. As seen in a third view of the data center 714, User 1 AppDB (716) has been provisioned in what was previously an available implementation resource 703.

The provisioning system may not only work for proposed computing resources, but also existing computer resources. In one embodiment, the provisioning system may receive a request to replace a failing (or failed) resource. The information from the failing resource or a snapshot of the failing resource may be provisioned using the operations described above as the proposed computing resource. The failing resource may have a role determined, and available implementation resources ranked according to the role and roles of other existing resources. In another embodiment, currently existing resources may have their placement reexamined. This reexamination of placement may be triggered by timing, such as every six months, or an event, such as an expansion of the data center. For example, after a data center has expanded the number of available computing resources, the provisioning system may receive a request to re-evaluate the placement of computing resources. The provisioning system may then determine the role of a computing resource and rank available implementation resources, including newly available computing resources using the roles of existing computing resources and shared infrastructure. Should a better match be found, the provisioning system may migrate the existing computer resource to the selected implementation resource.

Inferring roles and ranking of implementation resources may also be expanded to multiple proposed resources to determine a configuration, as seen in an example of a process 800 shown in FIG. 8. A list of available implementation resources may be received 802. Information about current user resources may be received 804. Proposed resource information may be received 806 with associated user data. Using the available implementation resources, a configuration of proposed resources using available implementation resources may be populated 810. The configuration may be ranked 812 by combining the ranking score of each proposed implementation resource. For example, each proposed resource may have a role inferred. Using the inferred roles, each resource may receive a ranking score using the roles with respect to current user resources and other proposed resources using a proximity condition. If more configurations exist 814, another configuration may be populated 810 and ranked 812. After which, configurations may be recommended 816 for implementation. A provisioning system may then instantiate the proposed resources using the recommended available implementation resources.

In another embodiment shown in FIG. 9, a process 900 may evaluate the available implementation resources before determining configurations. For example, list of available implementation resources may be received 902. Information about current user resources may be received 904. Proposed resource information may be received 906 with associated user data. Each available implementation resource may be evaluated 908 using each proposed resource resulting in a recommendation of an initial configuration of proposed resources. Using the initial ranking, the configuration may by optimized 910 by moving or swapping resource placement. Upon achieving a desired optimization, the ranking system may recommend a configuration. A provisioning system may then instantiate the proposed resources using the recommendation. In some embodiments, optimization may include meeting a minimum threshold of acceptable placements rather than a maximum ranked value.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases, or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the various embodiments as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the scope of the claimed subject matter to the specific form or forms disclosed, but on the contrary, the intention is to cover all modifications, alternative constructions, and equivalents falling within the spirit and scope of the various embodiments, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate various embodiments and does not pose a limitation on the scope of the claimed subject matter unless otherwise indicated. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for provisioning computing resources, comprising:
   under the control of one or more computer systems configured with executable instructions,
      obtaining, in connection with a request for a computing resource, one or more user-specified labels for the requested computing resource;
      analyzing, by one or more computing systems, the one or more user-specified labels to identify a plurality of label portions and inferring a role for the computing resource based at least in part on matching less than all of the plurality of label portions with at least one known word or phrase associated with the role;
      ranking, by the one or more computing systems, a set of one or more available implementation resources based at least in part on a corresponding inferred role for the requested computing resource;
      selecting, by the one or more computing systems and based at least in part on the ranking, an implementation resource for the requested computing resource; and
      provisioning the requested computing resource using the selected implementation resource.

2. The computer-implemented method of claim 1, wherein the inferred role is selected from a set of roles, each of at least a subset of the roles corresponding to a proximity condition relating the role to existing user computing resources.

3. The computer-implemented method of claim 1, wherein the user-specified labels include one or more key-value pairs corresponding to a role.

4. The computer-implemented method of claim 2, wherein the user-specified labels include a name of the computing resource, the name corresponding to a role form the set of roles.

5. The computer-implemented method of claim 1, wherein ranking includes determining shared infrastructure, the shared infrastructure used in conjunction with the inferred role to form a ranking score.

6. A computer-implemented method for provisioning computing services, comprising:
   under the control of one or more computer systems configured with executable instructions,
      receiving user data describing the one or more proposed computing resources;
      analyzing, by one or more computing systems, the user data to identify a plurality of data portions and inferring a role of the one or more proposed computing resources based at least in part on matching less than all of the plurality of data portions with at least one known word or phrase associated with the role, the role associated with a desired proximity condition, the proximity condition indicating a desired manner of provisioning computing resources having the role with respect to other computing resources having one or more roles from a set of roles;
      selecting, by the one or more computing systems and based at least in part on the proximity conditions of the inferred roles, one or more implementation resources; and
      instantiating the proposed computing resources using the selected one or more implementation resources.

7. The method of claim 6, wherein the desired proximity condition indicates a preference for selecting implementation resources having a closer proximity to the other computing resources.

8. The method of claim 6, wherein the role is selected from the group consisting of cluster, game server, cache, database, redundancy, web server and application server.

9. The method of claim 6, wherein the desired proximity condition indicates a preference for selecting implementation resources more distant to the computing resources.

10. The method of claim 9, wherein the desired proximity condition includes preferred distances between the role and one or more roles from the set of roles.

11. A computer system for determining computing resource placement, comprising:
one or more processors; and
memory, including instructions executable by the one or more processors to cause the computer system to at least:
receive user-specified data describing one or more proposed computing resources, the user-specified data including a plurality of data portions;
infer a role for the one or more proposed computing resources based at least in part on matching less than all of the plurality of data portions with at least one known word or phrase associated with the role;
select, based at least in part on the inferred role and one or more roles of provisioned computing resources, a set of available implementation resources;
provision the one or more proposed computing resources using the selected available implementation resources.

12. The computer system of claim 11, wherein selecting the set of available implementation resources further includes:
ranking available implementation resources based at least in part on the inferred role and roles of other provisioned computing resources.

13. The computer system of claim 11, wherein selecting the set of available implementation resources further includes:
determining related provisioned computing resources using the user-specified data from the one or more proposed computing resources and user-specified data from the provisioned computing resources; and
biasing the select operation toward the determined roles of the related provisioned computing resources.

14. The computer system of claim 12, wherein ranking the available implementation resources further includes ranking the available implementation resources based at least in part as to which infrastructure is preferably shared according to the roles of the available implementation resources and provisioned computing resources.

15. The computer system of claim 12, wherein ranking the available implementation resources further includes:
ranking the available computing resources with respect to whether power supplies are shared between the available implementation resources and provisioned computing resources.

16. One or more computer-readable non-transitory storage media having collectively stored thereon executable instructions that, when executed by one or more processors of a computer system, cause the computer system to at least:
analyze user data describing one or more computing resources to identify a plurality of data portions and infer a role based at least in part on matching less than all of the plurality of data portions with at least one known word or phrase associated with the role;
select an available implementation resource at least in part on the inferred role and on one or more roles of other resources provisioned for use by the user; and
taking one or more actions that cause a computing resource to be provisioned using the selected available implementation resource.

17. The computer-readable non-transitory storage media of claim 16, wherein analyzing the user data includes using at least one fuzzy matching algorithm to infer the role from user data.

18. The computer-readable non-transitory storage media of claim 16, wherein analyzing the user data further includes matching user data with a resource provisioned for use by the user and copying the role of the resource provisioned for use by the user as the inferred role.

19. The computer-readable non-transitory storage media of claim 16, wherein selecting the available implementation resource includes:
ranking one or more closer available implementation resources higher for roles having an affinity for clustering;
ranking one or more distant available implementation resources higher for roles having sensitivity to correlated failure; and
selecting an available implementation resource based at least in part on results from the ranking operations.

20. A computer program product embedded in one or more computer-readable non-transitory storage media and including instructions that, when executed by at least one computing device, cause the at least one computing device to:
select an existing computing resource having user data to reevaluate placement the user data including a plurality of data portions;
infer a role of the existing computing resource from analyzing the user data based at least in part on matching less than all of the plurality of data portions with at least one known word or phrase associated with the role, the role associated with a desired proximity condition, the proximity condition indicating a desired manner of provisioning computing resources having the role with respect to other computing resources having one or more roles from a set of roles;
select, based at least in part on the proximity condition of the determined role, an implementation resource for the existing computing resource; and
instantiate the existing computing resource using the selected implementation resource.

21. The computer program product of claim 20, wherein the instructions, when executed by at least one computing device, cause the at least one computing device to:
analyze implementation resource selection and user data of other users;
identify one or more words within the user data of other users having a sufficient correlation with an identified implementation resource selection consistent with an identified role; and
associate the one or more words with the identified role.

22. The computer program product of claim 20, wherein:
the instantiating of the existing computing resource is performed by a data plane, the data plane containing computing resources; and
the inferring of the role and the selecting of the implementation resource are performed by a control plane, the control plane being responsible for the administration of computing resources within the data plane.

23. The computer program product of claim 20, wherein the selecting of the existing computing resource is in response to an updated capacity of available implementation resources.

24. The computer program product of claim 20, wherein selecting an existing computer resource includes:
  detecting the existing computer resource is failing; and
  selecting a copy of the existing computer resource to be instantiated.

25. The computer-implemented method of claim 1, wherein analyzing the one or more user-specified labels includes matching the one or more user-specified labels with one or more associated roles stored in a dictionary.

* * * * *